United States Patent [19]

Arimoto et al.

[11] Patent Number: 5,378,271

[45] Date of Patent: Jan. 3, 1995

[54] TIRE POLISHING AND PROTECTIVE COMPOSITION

[75] Inventors: Kunio Arimoto, Takasago; Nobuo Yoshida, Kobe; Haruo Ohtani, Hyogo; Yasuhiko Ikkaku, Kobe, all of Japan

[73] Assignees: Ishihara Chemical Co., Ltd.; Ikkaku Industry Co., Ltd., both of Kobe, Japan

[21] Appl. No.: 112,460

[22] Filed: Aug. 27, 1993

[30] Foreign Application Priority Data

Sep. 16, 1992 [JP] Japan .................................. 4-273579

[51] Int. Cl.6 .................... C09D 193/04; C09D 183/06
[52] U.S. Cl. ........................................ 106/236; 106/3; 106/6; 106/7; 106/287.13; 106/287.14; 106/287.16; 106/238; 106/239
[58] Field of Search ............. 106/3, 6, 287.13, 287.14, 106/287.16, 7, 236, 238, 239

[56] References Cited

U.S. PATENT DOCUMENTS

| | | | |
|---|---|---|---|
| 4,600,436 | 7/1986 | Traver et al. | 106/3 |
| 4,693,840 | 9/1987 | Trinh et al. | 106/3 X |
| 4,790,877 | 12/1988 | Vadasz | 106/3 |
| 4,880,557 | 11/1989 | Ohara et al. | 106/3 X |

FOREIGN PATENT DOCUMENTS 64-171  1/1989  Japan .

*Primary Examiner*—Karl Group
*Attorney, Agent, or Firm*—Armstrong, Westerman, Hattori, McLeland & Naughton

[57] ABSTRACT

The invention provides a tire polishing and protective composition including, as dissolved or dispersed in an organic solvent, 2 to 25% by weight of a silicone varnish, 0.1 to 4% by weight of a rubber type polymer and 0.1 to 10% by weight of a tackifier.

6 Claims, No Drawings

TIRE POLISHING AND PROTECTIVE COMPOSITION

FIELD OF THE INVENTION

The present invention relates to a tire polishing and protective composition for tires of cars, bicycles and the like. This composition not only protects tires and imparts gloss even to old lusterless tires but also imparts water repellency to tires.

BACKGROUND ART

The tires of automobiles, bicycles and other vehicles collect dust, muds, etc. from the road to become soiled and unsightly. Moreover, as they are used for a long time, the tires lose their initial gloss and even if washed free of soils, they will remain dull and lusterless. Therefore, it has been proposed and practiced to apply a polishing agent to the surface of the tire to "renovate" the tire.

As such tire polishing agents, a solution or dispersion of silicone oil or wax in an organic solvent and an aqueous emulsion prepared therefrom with the aid of a surfactant are generally employed.

However, while these polishing agents impart good gloss and acceptable water repellency to tires, they are ready to be stripped off by rain and dust so that the effects are unavoidably transitory or short-lived.

The object of the present invention is to provide a tire polishing and protective composition which insures long-lasting gloss and water repellency after application to tires.

SUMMARY OF THE INVENTION

The inventors of the present invention found, after an assiduous exploration into this field of technology, that the above-mentioned object can be accomplished by providing a composition comprising a silicone varnish, a rubber type polymer and a tackifier in an organic solvent. The possible mechanisms involved in the successful attainment of the above-mentioned object and effects with such a composition are as follows. The silicone varnish contained in the polishing composition undergoes condensation reaction on the surface of the tire to form a tough silicone film in intimate contact with the substrate tire and the inherent gloss and water repellency of this silicone film imparts a highly lustrous and water-repellent surface to the tire. At the same time, the rubber type poller having rubber elasticity comparable to that of the tire rubber provides the polishing composition with a high compatibility with, and hence an improved adhesion to, the rubber of the tire, so that the coating of the composition can follow the deformation of the tire in running on the road and results excellent durability. Furthermore, the incorporated tackifier which is compatible with said rubber type polymer imparts sufficient tackiness for realizing a firmer adhesion of the polymer to the tire.

Thus, the present invention provides a tire polishing and protective composition comprising 2 to 25% by weight of a silicone varnish, 0.1 to 4% by weight of a rubber type polisher and 0.1 to 10% by weight of a tackifier as dissolved or dispersed in an organic solvent.

DETAILED DESCRIPTION OF THE INVENTION

The silicone varnish used in the present invention is a varnish comprising an organopolysiloxane compound having at least one group selected from methyl, ethyl and phenyl and containing at least 3 functional groups selected from hydroxy, methoxy and ethoxy per molecule as the nonvolatile component and an organic solvent. The organic solvent may be any ordinary solvent that is capable of dissolving said organopolysiloxane compound and, as such, includes toluene, xylene and mineral turpentine, among others. The concentration of said nonvolatile component may generally range from about 40% by weight to about 60% by weight. As typical commercial silicone varnishes, KR-272, KR-211 and ES-1004 (trademarks: products of Shin-Etsu Chemical Co., Ltd.) and SH-805, SH-840 and SH-7020 (trademarks: products of Toray Silicone Co., Ltd.) can be mentioned.

The proportion of the silicone varnish in the total composition of the invention is generally 2 to 25% by weight and preferably 4 to 20% by weight. When this proportion is less than 2% by weight, the gloss and water repellency it imparts cannot last long. Conversely when it is over 25% by weight, the gloss is sacrificed.

The rubber type polymer to be used in the present invention includes, inter alia, natural rubber, butadiene rubber, styrene-butadiene rubber, isoprene rubber, styrene-isoprene rubber, chloroprene rubber, nitrile rubber, ethylene-propylene copolymer, butyl rubber, urethane rubber and silicone rubber. Particularly preferred are styrene-butadiene rubber, styrene-isoprene rubber, hydrogenated products of such rubbers and vinyl monomer-grafted rubber type polymers. Any of these rubber type polymers exhibits rubber elasticity without undergoing crosslinking reaction.

As said hydrogenated products of styrene-butadiene rubber or styrene-isoprene rubber, a number of commercial products having hydrogenation degrees within the range of about 2 to 3 percent are available and can be used in the present invention. Among such commercial hydrogenated rubbers are Kraton G Series (trademark: product of Shell Chemical Co.), KL-1000 Series (trademark: product of Kuraray Co., Ltd.) and KL-2000 Series (trademark: product of Kuraray Co., Ltd.). As to the vinyl monomer-grafted rubber type polymers, the graft polymers obtainable by graft-polymerizing about 100 to 200 parts by weight of a vinyl-containing monomer to each 100 parts by weight of a rubber type polymer can be employed with advantage. Among the vinyl-containing monomers which can be used for this purpose are the conventional acrylic or methacrylic esters; acrylic or methacrylic esters containing such functional groups as hydroxy, carboxy, amino and glycidyl; styrene, vinyl acetate, maleic anhydride, itaconic acid and sorbic acid.

The proportion of said rubber type polymer in the composition of the invention is 0.1 to 4% by weight and preferably 0.2 to 3% by weight. If the proportion is less than 0.1% by weight, the gloss and water repellency will not last long, while the use of the rubber type polymer in excess of by weight results in uneven coating and poor appearance.

The tackifier mentioned above includes rosin type resins, petroleum resins and terpene type resins, etc., and among them, rosin type resins are particularly preferred. Suitable rosin type resins are, for example, gum rosin, wood rosin, tall oil rosin, hydrogenation or disproportionation products of such rosins, and esters of such rosins with monohydric alcohols. These tackifiers can be used singly or in an appropriate combination Among the esters mentioned above are the corresponding methyl esters, ethyl esters, butyl esters, dodecyl esters, etc., and rosins in which more than 90% of available carboxyl groups have been esterified can also be employed.

The proportion of said tackifier in the composition of the invention is generally 0.1 to 10% by weight and preferably 0.5 to 8% by weight. If its proportion is less than 0.1% by weight, the tackifier will not be able to soften the rubber type polymer to a sufficient extent, causing uneven coating and poor gloss and water repellency. On the other hand, if the proportion of the tackifier exceeds 10% by weight, the film-forming component of the composition will gain in hardness to cause uneven coating and adversely affect adhesion to the tire, resulting in reduced durability of the coating.

The composition of the present invention comprises the above-mentioned components in an organic solvent. The organic solvent may be any solvent that is able to provide a stable solution or dispersion of the above components but is preferably an aliphatic, aromatic or naphthenic hydrocarbons within the boiling range of 60 to 280° C. These solvents can be used independently or in combination. Specific organic solvents that can be used include hexane, heptane, isooctane, toluene, xylene, petroleum benzene, kerosene, mineral turpentine and so on.

The composition of the present invention may contain, if necessary, silicone oil. The addition of silicone oil improves workability in application to the tire and make the gloss of the tire more prominent and attractive. The level of addition of silicone oil is preferably about 5 to 25% by weight based on the total composition of the invention. The silicone oil is preferably a dimethylpolysiloxane in the viscosity range of about 100 to 10000 centistokes (cst) at 25° C.

When an ultraviolet absorber and/or an antioxidant is incorporated as a further additive, the tire can be protected against degradation on the strength of the inherent function of such additive. If necessary, a pigment and/or a perfume may also be incorporated. For reducing the risk of uneven coating, a leveling agent may also be added.

The composition of the present invention can be provided by dissolving or dispersing the respective components in the indicated proportions in said organic solvent. The conventional dissolution and dispersion procedures can be utilized for this purpose.

The composition of the present invention is used by its application to the tire surface. The method for application is not critical but includes a variety of known coating techniques such as brushing, spray-coating and so on. The composition can also be applied as a spray mist together with an appropriate propellant.

It is also possible to add a surfactant and water to the composition with stirring to prepare an aqueous emulsion and apply the emulsion to the tire by brushing, spraying, or other technique. While the surfactant that can be used for this purpose is not limited in type, nonionic surfactants such as a variety of higher alcohol or substituted phenol polyoxyethylene ethers and anionic surfactants such as a variety of higher alcohol sulfate ester salts can be mentioned by way of example. The method for preparing such an aqueous emulsion is not critical, either. To describe an exemplary procedure, a mixture comprising 20 to 80% by weight of the composition of the invention, 20 to 80% by weight of water and 0.2 to 5% by weight of said surfactant can be emulsified in a homomixer, a high-speed mill, a high-pressure emulsifying machine or the like. It is also possible to fill a spray-gun or other applicator with a mixture of the composition of the invention, water, surfactant and, if necessary, an appropriate propellant, shake the applicator to emulsify the contents before use and apply the emulsion in a mist form to the tire.

The tire polishing and protective composition of the present invention imparts, on application to the tire surface, not only a high gloss but also sufficient water repellency to the tire and the gloss and water repellency so imparted last for a long time. The composition also exerts a protective effect on the tire.

EXAMPLES

The following examples are further illustrative of the present invention.

Production Example 1

| Production of rubber type Polymer A | |
| --- | --- |
| Styrene-butadiene copolymer (SBR #1502) | 100 parts by weight |
| Methyl methacrylate | 40 parts by weight |
| Methyl acrylate | 10 parts by weight |
| Glycidyl methacrylate | 5 parts by weight |
| Benzoyl peroxide | 1 part by weight |
| Solvent | q.s. |

The above mixture was heated for graft polymerization in nitrogen stream at 70°–80° C. for 8 hours and the reaction product was then purified by reprecipitation from methanol to provide rubber type polymer A. The film properties of rubber type polymer A were $Tb=150$ kg/cm$^2$ and $Eb=500\%$.

Production Example 2

| Production of rubber type polymer C | |
| --- | --- |
| Natural rubber (Pale crepe) | 100 parts by weight |
| Methyl methacrylate | 100 parts by weight |
| Vinyl acetate | 100 parts by weight |
| Benzoyl peroxide | 1 part by weight |
| Solvent | q.s. |

The above mixture was subjected to graft polymerization in the same manner as described for rubber type polymer A to provide rubber type polymer C. The film properties of this rubber type polymer C were $Tb=70$ kg/cm$^2$ and $Eb=150\%$.

Example 1

The composition of Table 1 was applied to tires and the coated tires were evaluated for gloss, water repellency, surface condition (evenness), durability and protective effect. The polymers prepared in Production Examples 1 and 2 were used as rubber type polymers A and C, respectively. As rubber type polymer B, a styrene-butadiene block copolymer (Califlex TR-1101, trademark of Shell Chemical Co.) ($Tb=320$ kg/cm$^2$ $Eb=880\%$) was used The performance characteristics were evaluated in the following manner. The results are presented in Table 2.

Gloss: The surface gloss of the tire coated with the test composition was visually evaluated.

Water repellency: The tire coated with the test composition was exposed to a shower of water and its water repellency was visually evaluated.

Surface condition: The surface condition (evenness) of the tire coated with the test composition was visually evaluated.

Durability: A car fitted with the coated tires was washed with an automatic car washer and the number of cycles till failure (loss of gloss and water repellency) was determined.

Protective effect: A testpiece, sized 25×130 mm, taken from the side wall of a new tire was scrubbed with a sponge soaked with household neutral detergent, rinsed thoroughly and dried. Then, the testpiece was coated with the test composition and allowed to stand for 24 hours. The testpiece was then scrubbed with a sponge soaked with household neutral detergent, rinsed thoroughly, dried and subjected to ozone aging test (tensile elongation 40%, temperature 40° C., concentration of ozone 50 ppm). The testpiece was monitored every 4 hours and the time till formation of cracks was determined.

TABLE 1

| Component | Amount |
|---|---|
| Composition 1 of Invention | |
| Silicone oil (dimethylpolysiloxane) | 20% by weight |
| Silicone varnish SH-805 (Toray Silicone Co., Ltd.) | 24% by weight |
| Hydrogenated rosin | 4% by weight |
| Rubber type polymer A | 3% by weight |
| Xylene | 49% by weight |
| Composition 2 of Invention | |
| Silicone oil (dimethylpolysiloxane) | 15% by weight |
| Silicone varnish KR-213 (Shin-Etsu Chemical Co., Ltd.) | 20% by weight |
| Disproportionated gum rosin | 5% by weight |
| Rubber type polymer B | 2% by weight |
| Octane | 58% by weight |
| Composition 3 of Invention | |
| Silicone varnish SH-840 (Toray Silicone Co., Ltd.) | 21% by weight |
| Gum rosin | 8% by weight |
| Rubber type polymer C | 4% by weight |
| Mineral turpentine | 67% by weight |
| Composition 4 of Invention | |
| Silicone oil (dimethylpolysiloxane) | 15% by weight |
| Silicone varnish KR-272 (Shin-Etsu Chemical Co., Ltd.) | 18% by weight |
| Terpehe phenol resin | 6% by weight |
| Rubber type polymer A | 2% by weight |
| Octane | 59% by weight |
| Composition 5 of Invention | |
| Silicone oil (dimethylpolysiloxane) | 16% by weight |
| Silicone varnish SH-840 (Toray-Silicone Co., Ltd.) | 24% by weight |
| Terpene phenol resin | 8% by weight |
| Rubber type polymer C | 3% by weight |
| Xylene | 49% by weight |
| Composition 6 of Invention | |
| Composition 1 of Invention | 40% by weight |
| Surfactant(polyoxyethylene nonyl phenyl ether) (MOIGEN EA-140, DAIICHI KOGYOU SEIYAKU CO., LTD.) | 4% by weight |
| Water | 56% by weight |
| Composition 7 of Invention | |
| Composition 6 of Invention | 70% by weight |
| Propellant (liquefied petroleum gas) | 30% by weight |
| Comparative Composition 1 | |
| Silicone oil (dimethylpolysiloxane) | 40% by weight |
| Hexane | 60% by weight |
| Comparative Composition 2 | |
| Silicone oil (dimethylpolysiloxane) | 15% by weight |
| Bees wax | 60% by weight |
| Carbon powder | 5% by weight |
| Mineral turpentine | 60% by weight |
| Comparative Composition 3 | |
| Silicone oil (dimethylpolysiloxane) | 10% by weight |
| Silicone varnish SH-805 (Toray Silicone Co., Ltd.) | 35% by weight |
| Terpene phenol resine | 5% by weight |
| Rubber type polymer A | 3% by weight |
| Hexane | 47% by weight |
| Comparative Composition 4 | |
| Silicone oil (dimethylpolysiloxane) | 25% by weight |
| Silicone varnish KR-213 (Shin-Etsu Chemical Co., Ltd.) | 1% by weight |
| Hydrogenated rosin | 8% by weight |
| Rubber type polymer C | 2% by weight |
| Hexane | 64% by weight |
| Comparative Composition 5 | |
| Silicone oil (dimethylpolysiloxane) | 15% by weight |
| Silicone varnish SH-7020 (Toray Silicone Co., Ltd.) | 10% by weight |
| Gum rosin | 15% by weight |
| Rubber type polymer B | 1% by weight |
| Hexane | 59% by weight |
| Comparative Composition 6 | |
| Silicone oil (dimethylpolysiloxane) | 20% by weight |
| Silicone varnish SH-805 (Toray Silicone Co., Ltd.) | 20% by weight |
| Hydrogenated rosin | 0.05% by weight |
| Rubber type polymer B | 3% by weight |
| Hexane | 56.95% by weight |
| Comparative Composition 7 | |
| Silicone oil (dimethylpolysiloxane) | 18% by weight |
| Silicone varnish SH-805 (Toray Silicone Co., Ltd.) | 20% by weight |
| Terpene phenol resin | 8% by weight |
| Rubber type polymer A | 6% by weight |
| Hexane | 48% by weight |
| Comparative Composition 8 | |
| Silicone oil (dimethylpolysiloxane) | 15% by weight |
| Silicone varnish SH-840 (Toray Silicone Co., Ltd.) | 24% by weight |
| Gum rosin | 10% by weight |
| Rubber type polymer B | 0.05% by weight |
| Hexane | 50.95% by weight |

TABLE 2

| Composition | | Gloss | Water repellency | Surface condition | Durability | Protective effect (hrs.) |
|---|---|---|---|---|---|---|
| This invention | 1 | Excellent | Good | Good | >10 | 24 |
| | 2 | Excellent | Good | Good | >10 | 24 |
| | 3 | Good | Good | Good | >10 | 24 |
| | 4 | Good | Good | Good | 10 | 20 |
| | 5 | Good | Good | Fair | 10 | 20 |
| | 6 | Good | Good | Good | 10 | 24 |
| | 7 | Good | Good | Good | 10 | 20 |
| Comparative Composition | 1 | Good | Good | Good | <1 | <4 |
| | 2 | Poor | Good | Good | 1 | <4 |
| | 3 | Poor | Good | Poor | >10 | 20 |
| | 4 | Good | Good | Good | 4 | 8 |
| | 5 | Poor | Good | Poor | 10 | 24 |

TABLE 2-continued

| Composition | Gloss | Water repellency | Surface condition | Durability | Protective effect (hrs.) |
|---|---|---|---|---|---|
| 6 | Good | Good | Good | 6 | 12 |
| 7 | Poor | Good | Poor | 10 | 24 |
| 8 | Good | Good | Good | 6 | 12 |

What is claimed is:

1. A tire polishing and protective composition which is a solution or dispersion comprising:
   (i) 2 to 25% by weight, based on the total weight of the composition, of a silicone varnish comprising (a) an organopolysiloxane compound having at least one group selected from methyl, ethyl and phenyl and containing at least 3 functional groups selected from hydroxy, methoxy and ethoxy per molecule, and (b) an organic solvent, said organopolysiloxane being dissolved in an organic solvent to a concentration of 40–60 percent by weight,
   (ii) 0.1 to 4% by weight, based on the total weight of the composition, of a rubber polymer selected from the group consisting of natural rubber, butadiene rubber, styrene-butadiene rubber, hydrogenated styrene-butadiene rubber, isoprene rubber, styrene-isoprene rubber, hydrogenated styrene-isoprene rubber, chloroprene rubber, nitrile rubber, ethylene-propylene copolymer, butyl rubber, urethane rubber, silicone rubber and rubber polymers prepared by graft polymerizing said rubber polymers with a vinyl monomer,
   (iii) 0.1 to 10% by weight, based on the total weight of the composition, of a tackifier selected from the group consisting of rosin resins, petroleum resins and terpene resins, and
   (iv) an organic solvent in an amount of the balance.

2. A tire polishing and protective composition according to claim 1, wherein said rubber polymer is a styrene-butadiene rubber, a styrene-isoprene rubber, a hydrogenated product thereof or a vinyl monomer-grafted rubber polymer.

3. A tire polishing and protective composition according to claim 1, wherein said tackifier is a rosin resin.

4. A tire polishing and protective composition according to claim 1, 2 or 3 which further contains 5 to 25% by weight of silicone oil which is a dimethylpolysiloxane in the viscosity range of 100 to 1,000 centistokes at 25° C.

5. A tire polishing and protective composition which is an aqueous emulsion comprising 20 to 80% by weight of the composition of any one of claims 1, 2 or 3, 20 to 80% by weight of water and 0.2 to 5% by weight of a surfactant.

6. A tire polish and protective composition which is an aqueous emulsion comprising 20 to 80% by weight of the composition of claim 4, 20–80% by weight of water and 0.2 to 5% by weight of a surfactant.

* * * * *